United States Patent [19]

Balomenos

[11] Patent Number: 4,642,081
[45] Date of Patent: Feb. 10, 1987

[54] ADJUSTABLE DRIVE BELT

[76] Inventor: Robert J. Balomenos, 5726 Appoline, Dearborn, Mich. 48126

[21] Appl. No.: 742,407

[22] Filed: Jun. 7, 1985

[51] Int. Cl.$^4$ ............................................. F16G 7/06
[52] U.S. Cl. .................................... 474/253; 474/255; 24/31 B
[58] Field of Search .............................. 474/253–258; 24/31 R, 31 B, 31 C, 31 F, 31 L, 31 H, 31 W, 31 V

[56] References Cited

U.S. PATENT DOCUMENTS

| | | | |
|---|---|---|---|
| 983,712 | 2/1911 | Heinel | 24/31 B |
| 3,461,733 | 8/1969 | Peterson | 474/256 |
| 3,744,095 | 7/1973 | Tomlinson | 474/255 X |
| 3,747,165 | 7/1973 | Brown | 24/31 F |
| 3,748,699 | 7/1973 | Cunningham | 474/256 X |
| 4,207,776 | 6/1980 | Helt | 74/235 |
| 4,227,424 | 10/1980 | Schleappe | 474/256 |
| 4,254,666 | 3/1981 | Seredick | 474/253 |
| 4,279,606 | 7/1981 | Berg | 474/257 |
| 4,336,021 | 6/1982 | Haines | 474/256 |

FOREIGN PATENT DOCUMENTS 0003786 of 1912 United Kingdom ................ 24/31 B Primary Examiner—James A. Leppink
Assistant Examiner—Thuy M. Bui
Attorney, Agent, or Firm—Gifford, Groh, VanOphem, Sheridan, Sprinkle & Dolgorukov

[57] ABSTRACT

A flexible drive belt for coupling at least two pulleys such as those found on a motor vehicle engine. The belt is manually installable without adjusting the distance between the pulleys and is particularly useful for temporary or emergency installation in place of a broken drive belt. The belt includes first and second ends which are fastened together to form an endless drive belt. The first end of the belt is provided with a series of openings which accept a corresponding number of projections which extend perpendicular to an intermediate surface of the second belt end. Both the first and second belt ends are provided with intermediate surfaces such that when joined a smooth inner surface is formed. For a permanent installation, locking pins may be disposed within throughbores extending through the sides of the projections such that the projections are prevented from unmating with the openings of the first end. The overall length of the belt may be varied by shortening the ends of the belt to shorten the belt or by varying the placement of the projections with respect to the openings to lengthen the belt.

14 Claims, 4 Drawing Figures

ADJUSTABLE DRIVE BELT

BACKGROUND OF THE INVENTION

I. Field of the Invention

This invention relates to a drive belt for coupling independent pulleys and, in particular, to a flexible drive belt of adjustable length for utilization as an emergency replacement for a continuous loop belt.

II. Description of the Prior Art

Flexible belts have long been used to couple and drive two or more independent pulleys such as the type found on motor vehicle engines, generators, machinery and the like. These belts are ordinarily a continuous loop and therefore are not readily installed on inaccessible pulleys or on pulleys disposed between components of the machine. Moreover, in order to provide sufficient tension in the belt to efficiently drive the pulleys, it is often necessary to detach one or more of the pulleys prior to installing the belt and thereafter, reposition the pulley. This process can be extremely difficult and time consuming particularly where the proper tools are unavailable.

In order to overcome the inherent disadvantages of the continuous loop drive belts, various adjustable and free-end belts were developed which permitted installation in emergency situations or where the axial end of the pulley is obstructed. Means for securing the ends of the belt included a plurality of interlocking serrations, metal latches, rotatably engaging plugs and various male/female connectors. Although useful as an emergency stopgap until a replacement continuous loop belt could again be installed, there previously known variable belts are only as strong as the connection which secures the ends of the belt. Since the pulleys on engines and similar machinery rotate at extremely high speeds, the tension placed on these various connectors can be too much for the belt to handle resulting in breakage and possible injury. This is particularly true where the connecting means creates and uneven inner surface which travels along the pulleys.

The more versatile connectors provide reinforced strength while eliminating any grooves, bumps, or the like on the inner surfaces of the belt. However, the prior known belts require multiple fastening means which increase the manufacturing costs of the device. Since drive belts are preferrably inexpensive components of the machine because of their short life-span, increased manufacturing costs limit the usefulness of the belt. Moreover, these multi-connector drive belts increase the inherent complexity of installing the belts.

SUMMARY OF THE PRESENT INVENTION

The present invention is an improved drive belt for coupling at least two pulleys which overcomes the disadvantages of the previously known adjustable drive belts by providing connecting means capable of withstanding the tensions created by the action of the pulleys.

The adjustable drive belt according to the present invention generally comprises first and second ends which are fastened together to form an endless loop belt. One end of the belt is provided with a series of openings which accept a corresponding number of projections extending perpendicular to the surface of the other end of the belt. The projections each include a cylindrical base portion, and a concial head which prevents the projection from disengaging once it is placed through the opening. Both the first and second belt ends are provided with intermediate surfaces such that when joined, a smooth inner surface is formed.

For permanent installation, the head portion of the projections is provided with a lateral throughbore designed to accept a locking pin. The locking pin includes a conical segment disposed at opposite ends which facilitate placement of the pin and prevents removal of the pin once in place. With the locking pin positioned through the head portion of the projections, the projections are further prevented from inadvertently disengaging from the openings of the first belt end.

As with conventional drive belts, the belt of the present invention is made of a flexible, wear resistant material and has a substantially trapezoidal cross-section. In addition, the overall length of the belt may be varied by shortening the ends of the belt until the desired size is obtained.

Other objects, features, and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views, and in which.

DETAILED DESCRIPTION OF A PREFERRED EMBODIMENT OF THE PRESENT INVENTION

Figure 1:
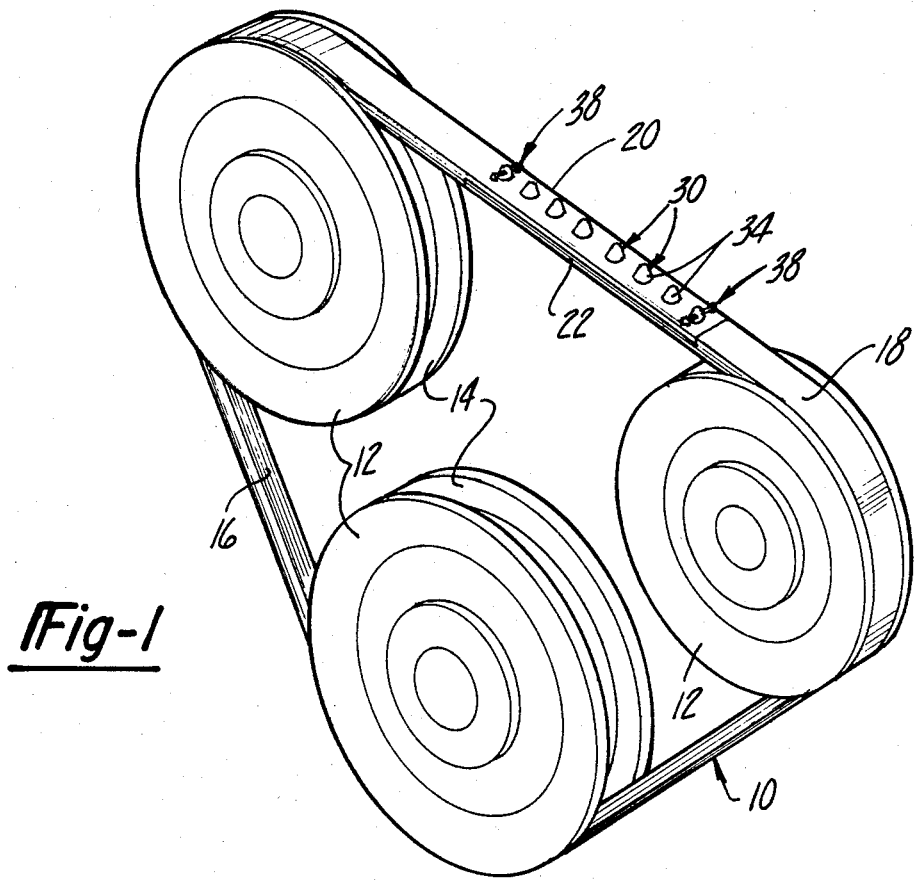
FIG. 1 is a perspective view of a preferred embodiment of the present invention installed on a pulley system.
Figure 2:
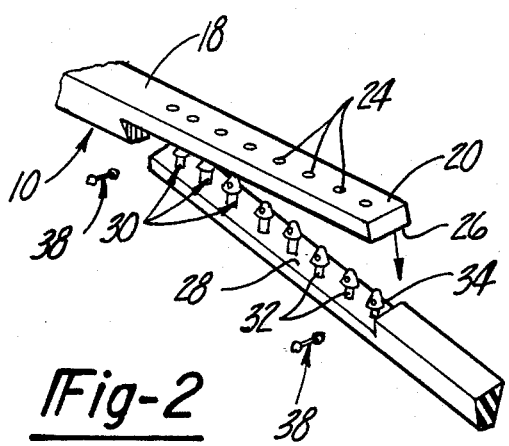
FIG. 2 is a detailed perspective of the fastening assembly of the present invention.

Referring generally to FIGS. 1 and 2, a flexible drive belt 10 embodying the present invention is thereshown mounted to a plurality of pulleys 12 of the type found on motor vehicle engines and industrial machinery (not shown). Generally, the conventional pulley system includes at least one main pulley 12 driven by the engine or machinery and one or more pulleys 12 which drive an accessory component (not shown) and are drivably connected to the main pulley 12 by the belt 10. The belt 10 may be constructed of a nylon or rubber material which provides strength and flexibility and preferably has a trapezoidal cross-section which corresponds to the peripheral groove 14 of the conventional pulley 12. The shorter parallel wall of the trapezoidal cross-section defines an inner surface 16 of the belt 10 and the longer parallel wall defines outer surface 18.

As is best shown in FIG. 2, the belt 10 includes a first end 20 and a second end 22 which are secured together to form a continuous loop belt as will be hereinafter described. Both first end 20 and second end 22 are formed of the same material as the main portion of the belt 10 and, therefore, are sufficiently flexible to travel around the pulleys 12. In addition, the characteristics of the material from which the belt 10 is formed allow the ends 20 and 22 to be shortened by cutting away any excess material. This permits the user to shorten the overall length of the belt 10 to conform to specific requirements.

Referring still to FIG. 2, the first end 20 of the belt 10 includes a plurality of linearly aligned holes 24 which extend through the end 20 of the belt 10 from outer surface 18 to an intermediate surface 26 of first end 20. The intermediate surface 26 is in spaced parallel arragement to outer surface 18 and is formed by removing an elongated portion of the belt 10 at first end 20. The removed portion and, therefore, the intermediate surface 26 may be any desired length. However, in the preferred embodiment, intermediate surface 26 extends only as far as the holes 24.

Second end 22 of the belt 10 similarly includes an intermediate surface 28 which is in spaced parallel arrangement to inner surface 16. When ends 20 and 22 of the belt 10 are connected, as will be hereinafter described, intermediate surfaces 26 and 28 abut as shown in FIGS. 3 and 4.

Figure 3:
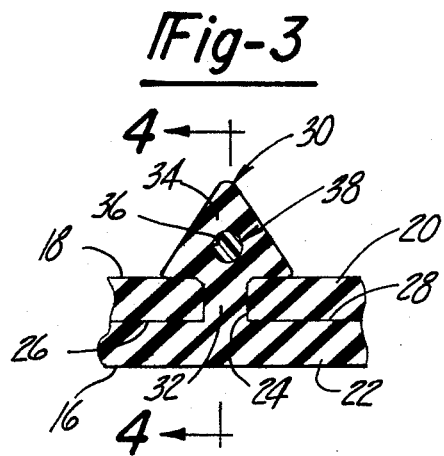
FIG. 3 is a cross-sectional view of a portion of the present invention as viewed from one side of the invention.
Figure 4:
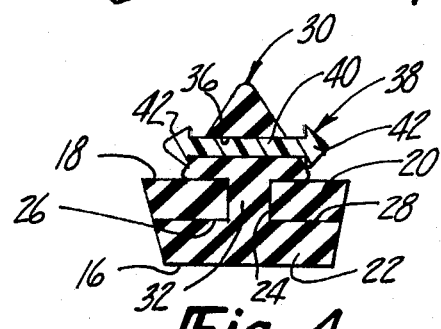
FIG. 4 is a cross-sectional view of the present invention as viewed along line 4—4 of FIG. 3.

Referring now to FIGS. 2 through 4, integrally formed with second end 22 of the belt 10 and extending perpendicular to intermediate surface 28, are a plurality of projections 30. In the preferred embodiment, the projections 30 each comprise a cylindrical base 32 and a substantially conical head 34. The base 32 of the projection 30 has a length equal to the length of the hole 24 such that when ends 20 and 22 are connected, the head 34 of projection 30 will extend completely through the hole 24. The diameter of the base of the conical head 34 is slightly larger than the diameter of the hole 24 and is constructed of the same resilient material as is the belt 10 so that it can be squeezed through the hole 24 but once in place removal from the hole 10 is resisted. The conical shape of the head 34 facilitates passing the head 34 through the hole 24. However, it is to be understood that the head 34 of projection 30 may be any shape which allows secure connection of ends 20 and 22.

As is best shown in FIG. 4, the head 34 of projection 30 preferably includes a transverse throughbore 36 which extends through the center of the head 34 perpendicular to the axis of the projection 30. The throughbore 36 is designed to accept a locking pin 38 which permanently secures ends 20 and 22 by preventing the head 34 of the projection 30 from withdrawing from the hole 24. The locking pin 38 comprises an intermediate portion 40, which has a diameter corresponding to the diameter of the throughbore 36, and a pair of enlarged end portions 42. The end portions 42 preferably have a conical shape to facilitate placement of the locking pin 38 and to prevent removal thereof. Alternatively, the end portions 42 may be any shape which will prevent the locking pin 38 from being inadvertently removed from the throughbore 36. Once in place, the end portions 42 of the locking pin 38 will be disposed on opposite sides of the head 34 of the projection 30 thereby preventing the locking pin 38 from being removed from the throughbore 36. Consequently, projection 30 is prevented from being removed from hole 24. Thus, the shape of the projection 30 and the locking pin 38 lockingly secures first end 20 to second end 22 of the belt 10 thereby forming a continuous loop drive belt.

Use of the present invention allows simple and convenient attachment of a drive belt to the pulleys 12 of a vehicle engine or like machinery. Since the first end 20 is provided with a plurality of holes 24 and the second end 22 is provided with a corresponding number of projections 30, both ends 20 and 22 may be shortened by cutting off equal segments until a belt 10 of the desired length is obtained. Once the belt 10 is shortened to the desired length, the belt 10 is mounted to the pulleys 12 such that inner surface 16 is disposed within the grooves 14 of the pulleys 12. The trapezoidal cross-section of the belt 10 conforms to the inwardly sloping walls of the grooves 14. However, it is to be understood that the belt 10 may have any cross-sectional shape which conforms to the grooves 14 of the pulleys 12, including rectangular.

To connect first and second ends 20 and 22 once the belt 10 is in position, each of the projections 30 of the second end 22 is forced through the corresponding hole 24 of the first end 20 until the conical heads 34 of the projections 30 extend completely through the holes 24. In the fully secured position shown in FIGS. 3 and 4, the first end 20 of the belt 10 is disposed between the intermediate surface 28 of the second end 22 and the conical heads 34 of projections 30. This prevents the projections 30 from being inadvertently removed from the holes 24. In addition, although the preferred embodiment contemplates a corresponding number of holes 24 and projections 30 and therefore equal length first and second ends 20 and 22, alternatively the belt 10 may be lengthened by staggering the ends 20 and 22 in relation to each other such that each projection 30 need not be disposed within a hole 24.

In order to lockingly secure the two ends 20 and 22 of the belt 10, the locking pin 38 is placed through the throughbore 36 of the projection 30. The end portions 42 of the locking pin 38 facilitate placement of the locking pin 38 in the throughbore 36 and once in place prevent the locking pin 38 from being removed. In the locked position, the two end portions 42 are disposed on opposite sides of the head 34 of projection 30 thereby preventing movement in either direction. In the preferred embodiment, at least two locking pins 38 are utilized wherein each locking pin 38 is disposed through the two end projections 30 as is shown in FIG. 1. Alternatively, each projection 30 may be provided with a locking pin 38 to strengthen the locking engagement. Moreover, it is to be understood that the conical shape of the head 34 of projection 30 prevents inadvertent disengagement of the two ends 20 and 22 and the belt 10 of the present invention could if desired be utilized without locking pins 38, particularly with low speed machinery.

Thus, the present invention provides a belt 10 which is easily attached to a series of pulleys 12 without adjustment of the pulley position or additional tools. The belt 10 may be utilized as an emergency replacement until a conventional continuous loop belt can be secured or as a permanent replacement belt for a variety of applications. In either case, the belt 10 provides a smooth and continuous inner surface 16 which engages the peripheral edge of the pulleys 12 thereby preventing premature wear which may result from exposed edges or an uneven inner surface 16.

The foregoing detailed description has been given for clearness of understanding only and no unnecessary limitations should be understood therefrom as some modifications will be obvious to those skilled in the art without departing from the spirit of the appended claims.

I claim:

1. An adjustable drive belt comprising:

a main belt having spaced apart elongated inner and outer surfaces, said main belt having a first end and a second end, said first end having an intermediate lower surface spaced a first predetermined distance from said outer surface and at least one aperture extending from said outer surface to said intermediate lower surface, said at least one aperture having a predetermined diameter, said second end having an intermediate upper surface spaced a second predetermined distance from said inner surface; and means for fastening said first end of said belt to said second end of said belt to form an endless drive belt, said means for fastening comprising;

at least one projection extending outwardly from said intermediate upper surface of said second end in a direction away from said inner surface, said at least one projection having a cylindrical base extending from said intermediate upper surface and a head portion formed at an end of said cylindrical base and adapted to be received in said at least one aperture of said first end, said head portion having a predetermined maximum diameter greater than said predetermined diameter of said at least one aperture such that said head portion extends through said at least one aperture to securely connect said first end to said second end to form said endless drive belt.

2. The invention as defined in claim 1 wherein said head portion comprises a conical head formed at said end of said cylindrical base.

3. The invention as defined in claim 2 wherein said conical head is provided with a throughbore extending through the sides of said conical head perpendicular to said cylindrical base.

4. The invention as defined in claim 3 and further comprising means for locking said first belt end to said second belt end.

5. The invention as defined in claim 4 wherein said locking means comprises at least one locking pin having enlarged end portions wherein said locking pin is adapted to be received by said throughbore of said at least one projection whereby said enlarged end portions of said locking pin are disposed on opposite sides of said conical head of said at least one projection.

6. The invention as defined in claim 5 wherein said enlarged end portions of said locking pin have a substantially conical shape.

7. The invention as defined in claim 2 wherein said conical head is spaced a third predetermined distance from said intermediate upper surface, said third predetermined distance being substantially equal to said second predetermined distance of said second end.

8. The invention as defined in claim 1 wherein the number of said apertures in said first belt end corresponds to the number of said projections of said second belt end.

9. The invention as defined in claim 1 wherein segments of said first and second belt ends may be cut off whereby a belt of shorter lengths can be made while preserving said fastening means.

10. The invention as defined in claim 1 wherein said at least one projection is integrally formed with said second end of said belt.

11. The invention as defined in claim 1 wherein said belt is constructed of a semi-rigid material which provides flexibility and strength.

12. The invention as defined in claim 1 wherein said belt has a trapezoidal cross-section wherein the longer parallel wall defines said outer surface and the shorter parallel wall defines said inner surface of said belt.

13. The invention as defined in claim 1 wherein said intermediate upper surface is held in abutment with said intermediate lower surface by said means for fastening.

14. The invention as defined in claim 1 wherein said at least one projection is formed of resilient material.

* * * * *